US009097851B2

(12) United States Patent
Goodwin et al.

(10) Patent No.: US 9,097,851 B2
(45) Date of Patent: Aug. 4, 2015

(54) SYSTEM AND METHOD FOR COMPENSATING INSTABILITY IN AN AUTOFOCUS SYSTEM

(71) Applicant: Nikon Corporation, Tokyo (JP)

(72) Inventors: Eric Peter Goodwin, Tucson, AZ (US);
Daniel Gene Smith, Tucson, AZ (US);
Michael Sogard, Menlo Park, CA (US)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 14/182,504

(22) Filed: Feb. 18, 2014

(65) Prior Publication Data

US 2014/0233011 A1 Aug. 21, 2014

Related U.S. Application Data

(63) Continuation of application No. 12/750,356, filed on Mar. 30, 2010, now abandoned.

(60) Provisional application No. 61/165,426, filed on Mar. 31, 2009.

(51) Int. Cl.
*G02B 7/28* (2006.01)
*G01B 11/02* (2006.01)
*G02B 27/40* (2006.01)

(52) U.S. Cl.
CPC ...... *G02B 7/28* (2013.01); *G01B 11/02* (2013.01); *G02B 27/40* (2013.01)

(58) Field of Classification Search
CPC ........ G01B 11/02; G01B 11/026; G02B 7/28; G02B 27/40
USPC ......... 250/201.2, 201.4, 546, 559.38, 559.29; 356/614, 498, 500; 359/629, 698; 355/53, 55, 56, 508, 509
See application file for complete search history.

(56) References Cited

U.S. PATENT DOCUMENTS 2,885,923 A * 5/1959 Simmons ...................... 356/136
5,191,200 A * 3/1993 van der Werf et al. ..... 250/201.4
(Continued)

*Primary Examiner* — John Lee
(74) *Attorney, Agent, or Firm* — Yakov Sidorin; Quarles & Brady LLP

(57) ABSTRACT

An autofocus system and method designed to account for instabilities in the system, e.g. due to instabilities of system components (e.g. vibrating mirrors, optics, etc) and/or environmental effects such as refractive index changes of air due to temperature, atmospheric pressure, or humidity gradients, is provided. An autofocus beam is split into a reference beam component (the split off reference channel) and a measurement beam component, by a beam splitting optic located a predetermined distance from (and in predetermined orientation relative to) the substrate, to create a first space between the beam splitting optic and the substrate. A reflector is provided that is spaced from the beam splitting optic by the predetermined distance, to create a second space between the reflector and the beam splitting optic. The measurement beam component is directed at the substrate and a reflected measurement beam component through the first space between the substrate and the beam splitting optic, while the reference beam component is directed at the reflector and a reflected reference beam component is directed from the reflector through the second space between the beam splitting optic and the reflector. The reflected reference and measurement beam components are returned to the beam splitting optic, and emerge substantially collinear from the beam splitting optic. The reference and measurement beam components are then detected, and provide information that enables compensation for changes in the z position of the substrate that are due to instabilities in the autofocus system components and/or environmental factors.

24 Claims, 6 Drawing Sheets

(56) References Cited

U.S. PATENT DOCUMENTS

| | | | |
|---|---|---|---|
| 5,502,311 A * | 3/1996 | Imai et al. | 250/548 |
| 5,602,399 A * | 2/1997 | Mizutani | 250/548 |
| 6,020,964 A * | 2/2000 | Loopstra et al. | 356/500 |
| 6,124,601 A * | 9/2000 | Yoshii et al. | 250/559.29 |
| 6,734,437 B2 * | 5/2004 | Norioka et al. | 250/441.11 |
| 6,856,402 B2 * | 2/2005 | Hill | 356/487 |
| 7,286,240 B2 * | 10/2007 | Hill | 356/498 |
| 7,342,641 B2 * | 3/2008 | Sogard | 355/55 |
| 7,411,667 B2 * | 8/2008 | Van Asten et al. | 356/139.1 |
| 7,751,059 B2 * | 7/2010 | Van Asten et al. | 356/500 |
| 8,089,631 B2 * | 1/2012 | Hsu et al. | 356/499 |
| 2003/0128369 A1 * | 7/2003 | Hill | 356/517 |
| 2003/0151750 A1 * | 8/2003 | Hill | 356/517 |
| 2003/0169411 A1 * | 9/2003 | Ota | 355/55 |
| 2004/0000627 A1 * | 1/2004 | Schuster | 250/201.2 |
| 2004/0218158 A1 * | 11/2004 | Nishi | 355/30 |
| 2005/0057757 A1 * | 3/2005 | Colonna De Lega et al. | 356/497 |
| 2005/0068540 A1 * | 3/2005 | De Groot et al. | 356/512 |
| 2005/0179879 A1 * | 8/2005 | Pril | 355/50 |
| 2005/0179909 A1 * | 8/2005 | Krijnen | 356/500 |
| 2005/0259268 A1 * | 11/2005 | Schluchter | 356/500 |
| 2006/0187434 A1 * | 8/2006 | Sogard | 355/55 |
| 2006/0256346 A1 * | 11/2006 | Hill | 356/498 |
| 2006/0274324 A1 * | 12/2006 | Van Asten et al. | 356/516 |
| 2007/0008548 A1 * | 1/2007 | Shibazaki et al. | 356/498 |
| 2007/0013915 A1 * | 1/2007 | Van Asten et al. | 356/498 |
| 2010/0091292 A1 * | 4/2010 | Pfaff | 356/457 |
| 2010/0245829 A1 * | 9/2010 | Goodwin et al. | 356/445 |
| 2011/0069291 A1 * | 3/2011 | Sogard | 355/55 |
| 2011/0071784 A1 * | 3/2011 | Smith et al. | 702/94 |
| 2012/0008150 A1 * | 1/2012 | Smith et al. | 356/616 |
| 2014/0233011 A1 * | 8/2014 | Goodwin et al. | 356/4.05 |

* cited by examiner

GEOMETRY A

SIDE VIEW

TOP VIEW

END VIEW

GEOMETRY A

GEOMETRY B

SYSTEM AND METHOD FOR COMPENSATING INSTABILITY IN AN AUTOFOCUS SYSTEM

RELATED APPLICATIONS/CLAIM OF PRIORITY

This application is a continuation from the U.S. patent application Ser. No. 12/750,356 filed on Mar. 30, 2010 and titled "System and Method for Compensating Instability in an Autofocus System", which, in turn, claims priority from the U.S. provisional application Ser. No. 61/165,426, filed on Mar. 31, 2009. The disclosure of each of the above-mentioned patent applications is incorporated by reference herein in its entirety.

INTRODUCTION

The present invention provides an autofocus system and method designed to compensate for instabilities in the system, e.g. due to instabilities of system components (e.g. vibrating mirrors, optics, etc) and/or environmental effects such as refractive index changes of air due to temperature, atmospheric pressure, or humidity changes or gradients, any or all of which may affect the reliability of the autofocus output when an autofocus beam is directed at and reflected from a substrate.

Generally, in an autofocus system and method, an autofocus beam is directed at a substrate (e.g. in the manufacture of a semi conductor substrate), at an angle of incidence designed to enable the topography of the surface of the substrate to be determined. That determination is generally used to determine changes that should be made in the z position of the substrate, and to adjust the position of the stage that supports the substrate to enable such changes.

In a known autofocus (AF) system, e.g. of the slit detection type, broadband illumination is used to illuminate a set of sending slits that are projected onto the surface of the substrate at glancing angle of incidence. A vibrating mirror is used to translate the slit image(s) across a small portion of the substrate. Another image of the slit(s) is incident on a set of receiving slits with the same basic geometry as the sending slits (size, orientation, etc) to create a time varying signal that is related to the height of the substrate relative to the AF system. The set of slits imaged on the substrate are used in combination with moving the substrate past the AF system, and allows the height of the entire substrate surface to be mapped.

In such an autofocus (AF) system environmental fluctuations, such as refractive index changes of air due to temperature, atmospheric pressure, or humidity changes or gradients, might affect the reliability of the measured substrate height. The design of such an AF system generally requires a high angle of incidence on the substrate relative to the substrate surface normal to achieve a high sensitivity level to height changes of the substrate. The high angle of incidence also leads to a larger beam path length in air, with a corresponding increase in sensitivity to environmental changes. In addition, as future substrates get larger (e.g. with diameters on the order of 450 mm) the AF beams may be required to travel through an even longer region of air. Environmental control can only be achieved to a certain level. For example, in immersion lithography systems the evaporation of the immersion fluid contributes to temperature and humidity changes near the AF system.

In addition, instabilities in the mechanical components of an autofocus system, e.g. the vibrating mirrors, optics, etc., may also affect the reliability of the measured height of the substrate.

Thus, an autofocus system or method that enables compensation for instabilities that affect the reliability of the measured height of the substrate is desirable. The compensation may be in the form of a direct compensation of the measured height of the substrate, or it may be in the form of an output that identifies the likelihood that there are instabilities in the system that may be affecting the reliability of the measured substrate height, so that the source of such instabilities can be investigated.

SUMMARY OF THE PRESENT INVENTION

The present invention provides an autofocus system and method designed to compensate for instabilities in the system, e.g. due to instabilities of system components (e.g. vibrating mirrors, optics, etc) and/or environmental effects such as refractive index changes of air due to temperature, atmospheric pressure, or humidity changes or gradients, any or all of which may affect reliability of an autofocus determination of the topography of the substrate.

According to a basic aspect of the present invention, an autofocus beam is split into a reference beam component and a measurement beam component, by a beam splitting optic located a distance from (and in predetermined orientation relative to) the substrate, to create a first air space between the beam splitting optic and the substrate. A reflector is provided that is spaced from the beam splitting optic by the same distance, to create a second air space between the reflector and the beam splitting optic. The measurement beam component is directed at the substrate, and a reflected measurement beam component from the substrate is directed through the first air space between the substrate and the beam splitting optic, while the reference beam component is directed at the reflector, and a reflected reference beam component is directed from the reflector through the second air space between the beam splitting optic and the reflector. The reflected reference and measurement beam components are returned to the beam splitting optic, and emerge substantially collinear from the beam splitting optic. The reference and measurement beam components are detected, and provide output that enables compensation for changes in the height of the substrate that are due to instabilities in the autofocus system components and/or environmental factors.

In essence, with the present invention, an autofocus determination is produced by mapping the z position of the substrate relative to the reflector for the reference beam, which produces information that enables compensation for instabilities in the system components and/or environmental factors. The information enables autofocus compensation in the form of a direct compensation of the measured height of the substrate, or in the form of a signal that identifies the likelihood that there are instabilities in the system that may be affecting the reliability of the measured substrate height, so that the source of such instabilities may be investigated.

In one specific implementation of the principles of the present invention, the substrate is moveable in a first direction and the reflector (which may be in the form of a reference mirror) has a reflective surface in a plane oriented transverse to the first direction. The position and orientation of the reflector relative to the beam splitting optic is maintained substantially fixed.

In another specific implementation of the principles of the present invention, the substrate is moveable in a first direction and the reflector has a reflective surface in a plane oriented substantially parallel to the first direction. This implementation may be desirable where it is desired to position the non common first and second air spaces in close proximity to each other. Also, in this implementation, the beam splitting optic comprises a pair of adjacent 30-60-90 prisms with respective sides that are adjacent and offset from each other in the direction transverse to the first direction in which the substrate is moveable.

In the practice of the present invention, it is contemplated that the reference beam component will have a wavelength range that is a predetermined subset of the wavelength range of the autofocus beam, the reference and measurement beam sets that emerge from the beam splitting optic are directed through one or more slits and detected by means of one or more slit detectors, and detection of the reflected reference and measurement beam components comprises directing the reflected reference and measurement beam components through a beam splitter disposed behind a detection slit for the reflected reference beam component and the reflected measurement beam component.

In addition, the present invention also provides ways of compensating for factors such as index differences, index gradients, and changes in index gradient with time, particularly in the first and second air spaces, which could otherwise affect the autofocus determination. For example, to adjust for index differences in the non common first and second air spaces, the present invention directs a dedicated air supply to the non common first and second air spaces. To adjust for index gradients in the non common first and second air spaces, the reference and measurement beams that emerge from the beam splitting optic are directed through one or more slits and detected by means of slit detectors, and the geometry of the sending and detecting slits can be changed to reduce or remove the sensitivity to index gradients in the non common first and second air spaces. To adjust for changes in index gradients with time in the first and second non common air spaces, the present invention provides adjusting the size, shape and orientation of the detection slits.

Additional features of the present invention will become apparent from the following detailed description and the accompanying drawings.

BRIEF DESCRIPTION OF THE DRAWINGS

FIG. 2b is a schematic top view of the beam splitting optic of FIG. 2a;

FIG. 2c is a schematic end view of the beam splitting optic of FIG. 2a;

DETAILED DESCRIPTION

As described above, the principles of the present invention are particularly useful in an autofocus system and method of the slit detection type. The principles of the present invention are described herein in connection with a system and method of the slit detection type, and from that description the manner in which the principles of the present invention can be applied to other types of autofocus systems and methods (e.g. of the fringe detection type shown in U.S. provisional patent application Ser. No. 61/244,321 filed Sep. 21, 2009 and entitled "Goos-Hanchen compensation in auto-focus system by optimal spectrum or digital spectral filter", which is incorporated by reference herein for all purposes) will be apparent to those in the art. Also, while a slit type autofocus system and method generally provides autofocus beams that emerge from a plurality of slits and are directed through corresponding slits associated with slit detectors, the principles of the invention are described in connection with a single autofocus beam, a single slit on the sending side of a system and a single slit on the receiving side of the system, and those skilled in the art will recognize that those principles can be applied to a plurality of slits on the sending and receiving sides of the system (sometimes referred to herein as a plurality of "channels").

The principles of the autofocus system and method of the present invention are particularly useful in connection with a lithographic imaging system and method that images a substrate as part of the formation of a semiconductor wafer. The general principles by which a substrate can be imaged by a lithography system and method are shown and described in US published application US 2008/0231823, which is incorporated by reference herein. That published application shows and describes lithographic imaging systems of the "scanning" type and the "step and repeat" type, and also shows and describes a measurement system that monitors the position and movement of the substrate relative to an optical imaging system, and provides control information by which a substrate stage assembly can be moved to precisely position the substrate. The measuring system of that publication can incorporate an autofocus system and method that compensates for instabilities in the autofocus system and method, in accordance with the principles of the present invention.

Figure 1:
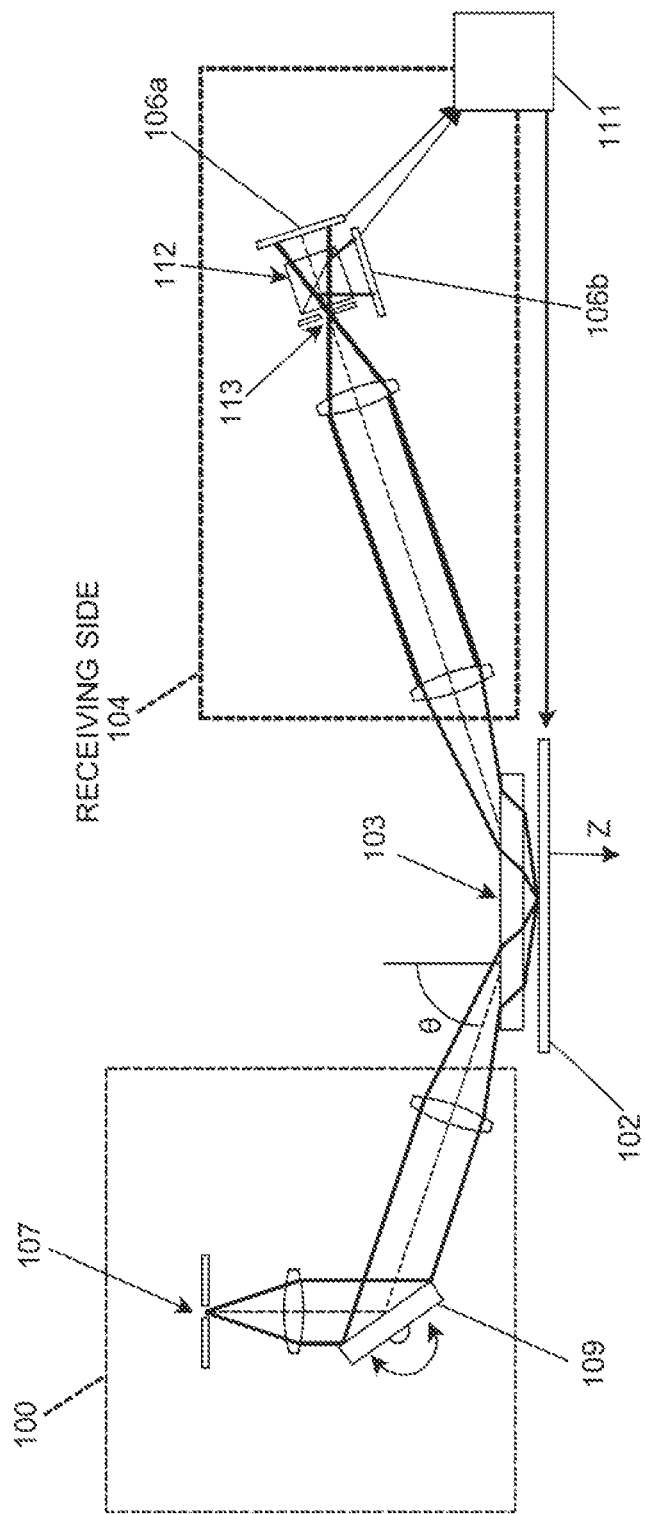
FIG. 1 is a schematic illustration of the manner in which an autofocus system and method compensates for instabilities in the system, that are due to system components and/or environmental factors, according to the principles of the present invention.

FIG. 1 schematically illustrates how the system and method of the present invention compensate instabilities due to system components or environmental factors in a slit detection type of autofocus (AF) system and method. The system has a sending side 100, within which light is reflected from (or refracted by) a series of slits 107 and is then directed at a substrate 102; and a receiving side 104, wherein light reflected from the substrate is directed to a detector device (which, as described herein, can comprise detector components 106a, 106b). On the sending side 100, the light (e.g. broadband or "white' light) is reflected from a vibrating mirror 109, directed at and reflected from the substrate 102 through a beam splitting optic 103, described further herein. The reflected light is directed through one or more slits 113 and detected at the detector device; the detector signal is used to determine the height (i.e. the surface topography) of the substrate surface in the vertical direction, and that determination (especially of changes in the height of the substrate) may be used later to control movement of the substrate in the z direction, preferably by controlling movement of the stage that supports the substrate. The manner in which a substrate stage can be controlled is described further in US published application US 2008/0231823, which has been incorporated by reference herein.

According to the principles of the present invention, the autofocus system and method are designed to compensate instability in the system components and/or environmental factors that can cause erroneous information to be produced at the detector device 106a, 106b. The principles of the present invention are designed to enable the information from the detector device to indicate if the substrate height information produced from the detector device is due to changes in the height of the substrate, which is what an AF system and method are normally seeking to determine, or whether the information may be erroneous, due to instability in the system due, e.g. to instability of system components and/or environmental factors.

Figure 2A:
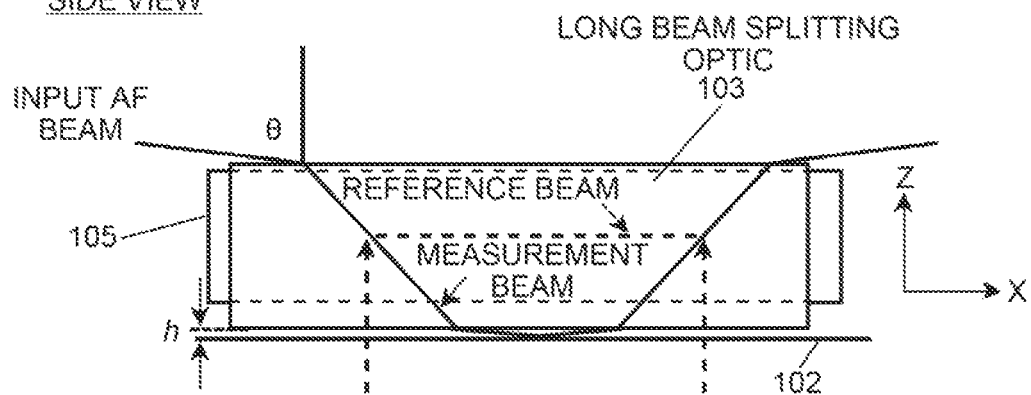
FIG. 2a is a schematic side view of one version of a beam splitting optic of the type that can be used in one Geometry (referred to as Geometry A) of a system and method according to the principles of the present invention.
Figure 2B:
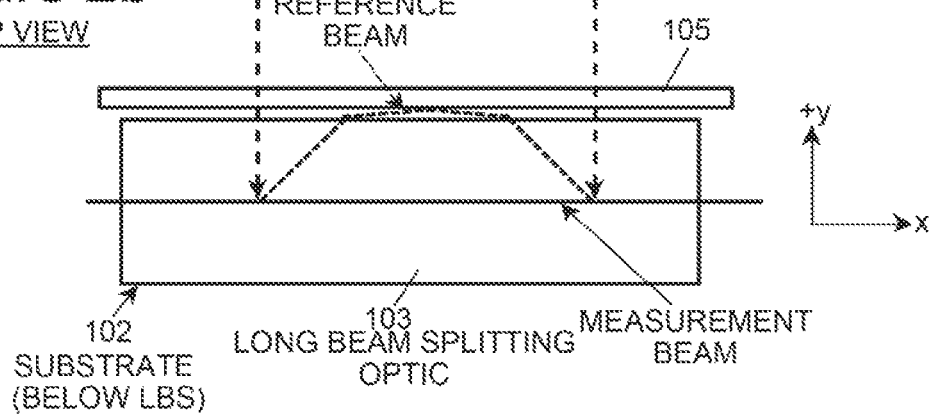
Figure 2C:
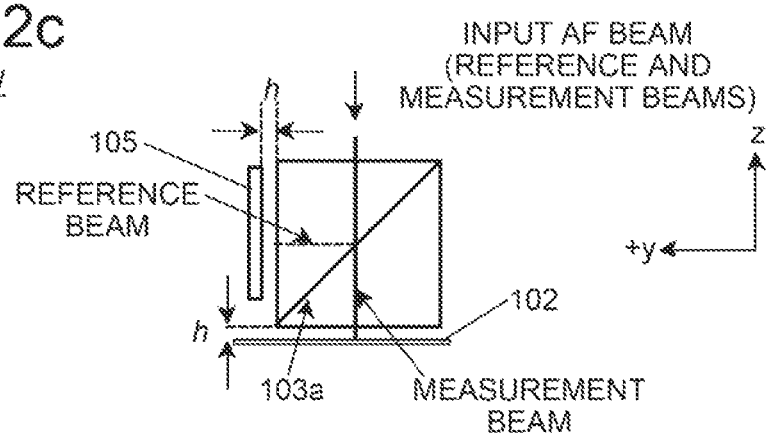

In a system and/or method according to the basic principles of the present invention, an autofocus beam (i.e. a beam that has been reflected or refracted from one of the slits 107) is split into a reference beam component and a measurement beam component, by the beam splitting optic 103 that has a beam splitting optic surface 103a (FIG. 2c). As seen in the example of FIGS. 2a-2c, the beam splitting optic 103 is located a nominal predetermined distance h from the substrate 102, and has a predetermined orientation relative to the nominal orientation of substrate 102, to create a first air space between the beam splitting optic 103 and the substrate 102. A reflector 105 is provided that is spaced from the beam splitting optic 103 by the same predetermined distance h, to create a second air space between the reflector 105 and the beam splitting optic 103. The first and second air spaces are non common but are of nominal thickness h.

It should be understood that in normal operation the height of the substrate, and thus its separation from the beam splitting optic 103, may vary somewhat from the nominal value of h. Similarly, the orientation of the substrate may vary somewhat from the nominal orientation during operation.

The measurement beam component is directed at the substrate 102 through the first air space, and a reflected measurement beam component from the substrate is directed through the first space to the beam splitting optic 103. The reference beam component is directed at the reflector 105 through the second air space, and a reflected reference beam component from the reflector is directed through the second air space to the beam splitting optic 103. Thus, the reflected reference and measurement beam components are returned to the beam splitting optic 103, and emerge substantially collinear from the beam splitting optic 103. The reference and measurement beam components are detected at the detector device 106a, 106b, and processed by a processor 111 (which can form part of the measurement system described in US published application US 2008/0231823, which has been incorporated by reference herein), to provide information that enables determination of changes in the z position of the substrate, and compensates instabilities due to system components and/or environmental factors.

In essence, the autofocus determination is produced by mapping the z position of the substrate 102 to the reflector 105 for the reference beam, and providing information from the processor 111 that compensates for instabilities in the system components and/or environmental factors. This is done by simply subtracting the apparent variations in h seen by the reference beam from the z position measured by the measurement beam, which removes any common (false) z motions. The remainder is the motion of the substrate 102 relative to the reflector 105. Thus, the autofocus determination is designed to compensate for the types of instabilities that might otherwise produce erroneous autofocus information.

More specifically, refractive index changes (e.g. in the space between the source and the substrate 102) could generate false z-translations (position indications) of the substrate. Locating the beam splitting optic 103 just above the substrate 102, as shown in FIGS. 2a and 2c, allows the reference beam to be split off from the autofocus beam in proximity to the reflector 105 and the substrate 102. This reference beam would preferably be one or more wavelength bands of the illumination light, although it could also be a certain polarization state. The reference beam emerges from the side of the beam splitting optic 103 and reflects off the reflector 105 that is disposed the same distance h from the output face of the beam splitting optic. The reference beam returns to the beam splitting optic 103, reflects upwards and emerges from the top surface of the beam splitting optic. Meanwhile, the measurement beam transmits through the beam splitting optic 103, emerges from the bottom and reflects off the top surface of the substrate 102 at the same angle of incidence (AOI) for which the AF system is designed, maintaining the same level of sensitivity. The substrate 102 is nominally the distance h away from the bottom output face of the beam splitting optic 103 to create the first air space. The measurement beam traces back through the beam splitting optic 103 and emerges collinear with the reference beam. With the exception of the detection system (which is described herein), the reference and measurement beams are completely common path, except for the path from the beam splitting optic surface 103a to the reflector/substrate and back. Therefore, the majority of the optical components of the AF system are traversed by both beams such that any drift will result in an equal change to both beams, which is removed when the apparent reference beam h position is subtracted from the measurement beam z position measurement. In addition, the path in the beam splitting optic 103 is matched, as is the distance h. Except for the air path traveled at the AOI ($\theta$) for the distance h between the beam splitting optic and the substrate (or reflector), the system is designed such that the same refractive index changes should be seen by both the measurement and reference beams. Thus, when the instabilities are due e.g., to environmental factors, measuring the effect of the environmental factors directly is the ideal way to correct for them, simply by subtracting. The residual air path susceptible to errors caused by environmental variations is given in equation 1, below.

$$OPL = 2h \tan(\theta)$$

In Equation 1: 'h' is the nominal distance from the beam splitting optic face to the substrate 102, and $\theta$ is the AOI of the AF beam on the substrate.

The principles of the present invention are designed such that for a nominal value of h of 1 mm and an AOI of 86°, the non common air path is about 28.6 mm. Global changes like atmospheric pressure should be the same for the reference space (the second air space) at 28.6 mm and the measurement space (the first air space) at 28.6 mm, but local changes such as temperature and humidity differences between the first air space and the second air space might introduce some errors (that are addressed below). By comparison, a conventional AF system for 300 mm diameter substrates has an air path of approximately 530 mm, or about 20× more sensitivity to environmental fluctuations.

In the actual practice of the present invention, there would be a plurality of AF channels, each of which would be associated with one of the slits 107, and each of which would be split by the beam splitting optic 103 to produce reference and measurement beam components for each slit. Those reference and measurement beam components would be directed through a slit 113 (for each AF channel) detected and processed in the manner described in this application. If the beam splitting optic 103 is stretched in the x-direction, so that its length approximates the diameter of the substrate (as schematically shown in FIG. 1), every AF channel creates its own reference signal at the desired wavelength(s). Since each channel has its own reference, and each set of measurement and reference beam components is directed through a respective slit 113, no extrapolation of the environmental errors is required to make corrections.

With the autofocus system and method of the invention, the substrate height is effectively mapped relative to the reflector 105 instead of relative to the stability of all of the components of the AF system. In practice, the reflector 105 would be attached to the side of the long beam splitting optic 103, with the air gap h formed by spacers made of a thermally stable material, such as a low expansion ceramic. The long beam splitting optic 103/reflector 105 combination would not be required to move, and so could be constructed in a mechanically stable manner so that any drift over the time required to map a substrate would be negligible. If higher accuracy monitoring of the reflector is required, a simple distance measuring interferometer (DMI) arrangement or other sensor system can be provided, to monitor the reflector position in real time.

Besides instability due to environmental factors, an instability that can affect an AF system is the instability of the mechanical components of the system. In FIG. 1, the AF beam is reflected from the vibrating mirror 109, and instability of the vibrating mirror's central angle can be a source of an erroneous substrate height determination in the system. Specifically, instability of the vibrating mirror 109 can cause the central angle to change over long periods of time and can lead to an apparent substrate height change. The reference channels will experience the same angle change of the vibrating mirror, and any errors due to this change will be automatically subtracted out when the reference signal is taken into account by the processor 111. Another advantage of the system and method of the present invention is that the AF reference channels can take measurements continuously, even when the substrate is not under the AF system. The multiple channels can be used to track changes in the vibrating mirror behavior and to maintain a reference to an offline calibration continuously, if desired.

As substrate sizes increase (e.g. to the order of diameters of about 450 mm), the air path through which the AF beam needs to travel increases substantially. Known versions of an AF system would use broadband illumination to minimize the errors due to the thin layer stack on the top of the substrate. The requirement of a large spectral bandwidth with a larger system size makes chromatic correction of the sending and receiving optics very difficult. It is also known that sending a converging beam through a large plane parallel plate (which is what the long beam splitting optic will look like optically) causes chromatic aberrations and spherical aberrations, among others. Clearly the optical design of the AF sending and receiving sides of the system would need to be changed to accommodate this large structure. However, the sign of the chromatic aberration introduced by this structure is opposite the sign of the chromatic aberration in a typical positive lens. Therefore, in the system and method of the present invention, the chromatic correction will likely be easier when considering the opposite sign chromatic aberration introduced by the plane parallel plate (long beam splitting optic 103). This should simplify the overall complexity of the rest of the AF optical design for a system and method according to the principles of the present invention.

The system and method shown in FIGS. 2a-2c has the sending and receiving sides of the AF system in a plane perpendicular to the substrate surface, as is common practice in known AF systems. However, it might be advantageous to turn the entire AF system on its side such that the sending and receiving sides of the AF system are in a plane parallel to the substrate surface. The measurement beam would then be the AF beam that reflects off the beam splitting optic 103 and gets directed downwards towards the substrate 102, while the reference beam would go straight through the beam splitting optic to the reference surface. One advantage of such an arrangement might be to relieve some of the space constraints near the projection lens by allowing the sending and receiving optics to be located further from the projection optics' optical axis. Alternatively, two AF systems could use the same long beam splitting optic (one in the standard perpendicular orientation and another in the parallel configuration) to measure and eliminate errors due to a shift of the long beam splitting optic relative to the substrate.

As mentioned earlier, the reference beam component would most likely be a dedicated subset of the source spectrum. To prevent leakage of the reference beam component to the substrate or the measurement beam component to the reflector, the source spectrum could be engineered such that the reference beam wavelength band is the only wavelength band present near those wavelengths. For example, the source could be 400-900 nm, with no light from 600-650 nm. The reference beam component could be 625 nm+/−5 nm, making it easier to fabricate a beam splitting optic coating that only reflects the reference beam component wavelengths.

Figure 3:
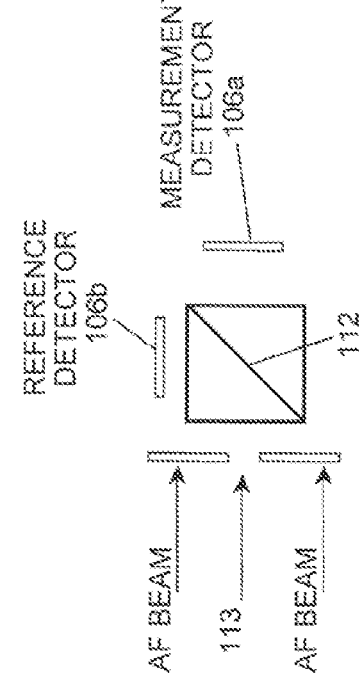
FIG. 3 is a schematic, simplified illustration of a portion of the receiving side of a system according to the principles of the present invention, and showing the location of the detection slit for a measurement and reference beam set on the receiving side of the system.

In order to detect the reference beam component, another beam splitting optic 112 (also referred to as a beam splitter) is provided, and is located after the slit(s) 113 through which the sets of reference and measurement beam components are directed. Ideally, a pair of reference and measurement beam components would use the same receiving slit 113; with a chromatic beam splitter 112 placed between the detection slits 113 and the detectors 106a, 106b. FIG. 3 is a relatively simple schematic to illustrate this feature. A single beam splitter 112 can easily split off the reference beam component from the measurement beam component for every autofocus channel.

Thus, in the practice of the present invention, the reference beam component may have a wavelength range that is a predetermined subset of the wavelength of the autofocus beam, the reference and measurement beams that emerge from the beam splitting optic are directed through one or more slits and detected by means of a slit detector, and detection of the reflected reference and measurement beam components comprises directing the reflected reference and measurement beam components through a beam splitter disposed behind the slits and to respective detectors for the reflected reference beam component and the transmitted measurement beam component.

In the implementation of the present invention that is shown in FIGS. 2a-2c the substrate is moveable in a first direction and the reflector 105 has a reflective surface in a plane oriented transverse to the first direction. The position and orientation of the reflector 105 relative to the beam splitting optic 103 is maintained substantially fixed. In another implementation of the principles of the present invention, schematically illustrated in FIG. 4, the substrate 102 is moveable in a first direction and a reflector 116 has a reflective surface in a plane oriented substantially parallel to the first direction (which is also parallel to the substrate). This implementation may be desirable where it is desired to position the non common first and second spaces in close proximity to each other. Also, in this implementation, the beam splitting optic 114 comprises a pair of adjacent 30-60-90 prisms with respective sides that are adjacent and offset from each other in the direction transverse to the first direction.

Figure 4:
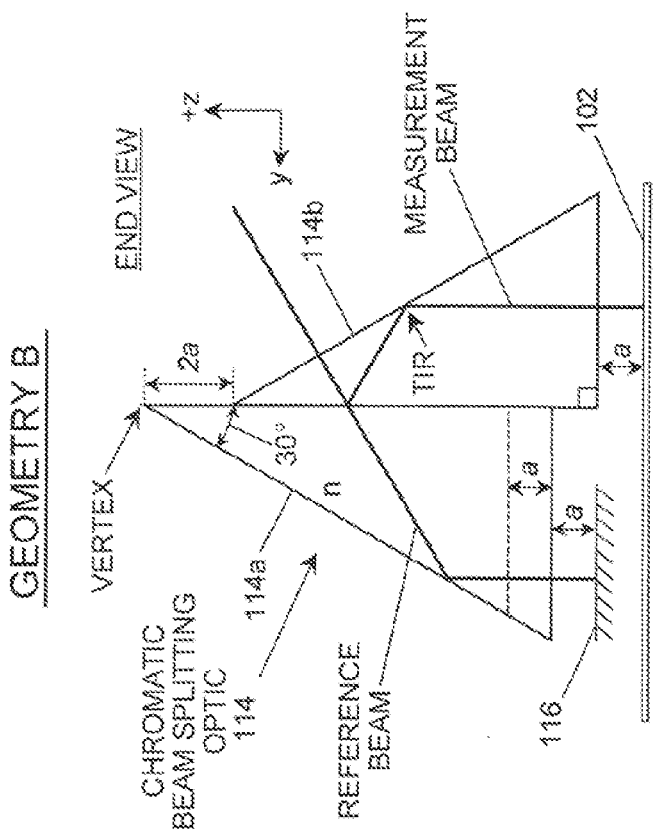
FIG. 4 is a schematic end view of another version of a beam splitting optic that can be used in another geometry (referred to as Geometry B) of a system and method according to the principles of the present invention.

Thus, although the non-common air path is minimal for the system described in FIGS. 2a-2c, it may also be even more advantageous for the non-common reference and measurement air paths to be in close proximity to each other. The implementation of the present invention shown in FIG. 4 provides a system designed to achieve this close proximity. Instead of two 45-45-90 prisms forming a beam splitting optic 103 (FIGS. 2a-2c), two 30-60-90 prisms 114a, 114b are used to form the beam splitting optic 114 of FIG. 4. When the beam is projected into the yz plane, it makes a 60 degree angle with the z-axis and is normal to the fact of the prism 114b. When the beam is projected onto the xz plane, it makes an angle of 86 degrees with the z-axis. A chromatic beam splitting optic coating reflects the measurement beam (in the configuration shown in FIG. 4), and transmits the reference wavelength(s). Each then reflects by total internal reflection (TIR) at the next prism face, or the face is coated, if preferred. Both beams are then normal to the substrate when projected onto the yz plane. If the distance from the bottom of the prism 114b on the right and the substrate is given as 'a', then the prism 114a must be altered such that the reference mirror is also a distance 'a' from the bottom of the reference beam prism, such that the air paths for the two beams (reference and measurement beams) are the same. In addition, the path through glass should be the same for both beams. The prism 114a vertex location can be relocated in the yz plane such that this condition is satisfied. In the example of FIG. 4, the reflector face 116 is in the same z position as the bottom of the prism 114b. Therefore, the reference prism 114a vertex is moved up in z a distance of 2a. In order to make the glass paths equal, the reference prism 114a must be made a thickness 'a' longer in the z direction, as shown.

It should be noted that in the implementation illustrated by FIG. 4, the AF beam could come in from the other side of this beam splitting optic 114, or that two AF sending and receiving systems could be used in this arrangement as well, so that the full spectrum could be used as both measurement and reference beams.

One important difference between the reference and measurement beam paths for the systems shown in FIGS. 2a-2c and FIG. 4 is the number of reflections. In the case of the beam splitting optic arrangement of FIGS. 2a-2c, the measurement AF beams have one reflection (off the substrate) while the reference AF beams have three reflections. Therefore parity is preserved except in the air space between the beam splitting optic and the reflector 105. The same is true for the system in FIG. 4, where the measurement AF beams have five reflections while the reference AF beams have three reflections.

Figure 5A:
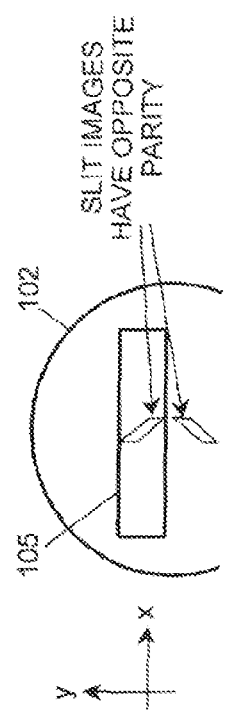
FIGS. 5a and 5b are schematic illustrations of one way of adjusting for the effect of index gradients, in a system and method according to the principles of the present invention.
Figure 5B:
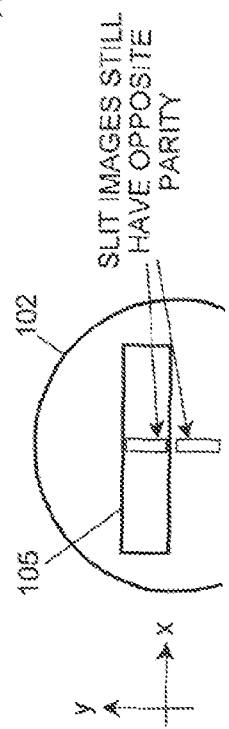

As illustrated schematically in FIGS. 5a, 5b, the same index of refraction gradient along the x direction in FIG. 5a will have the opposite effect on the AF signal in the two channels, while identical gradients in y will have the same effect on the reference and measurement AF signals. If the slit image is rotated 45° as shown in FIG. 5b, then the effect of the x gradients can be addressed in the manner discussed below.

Figure 6:
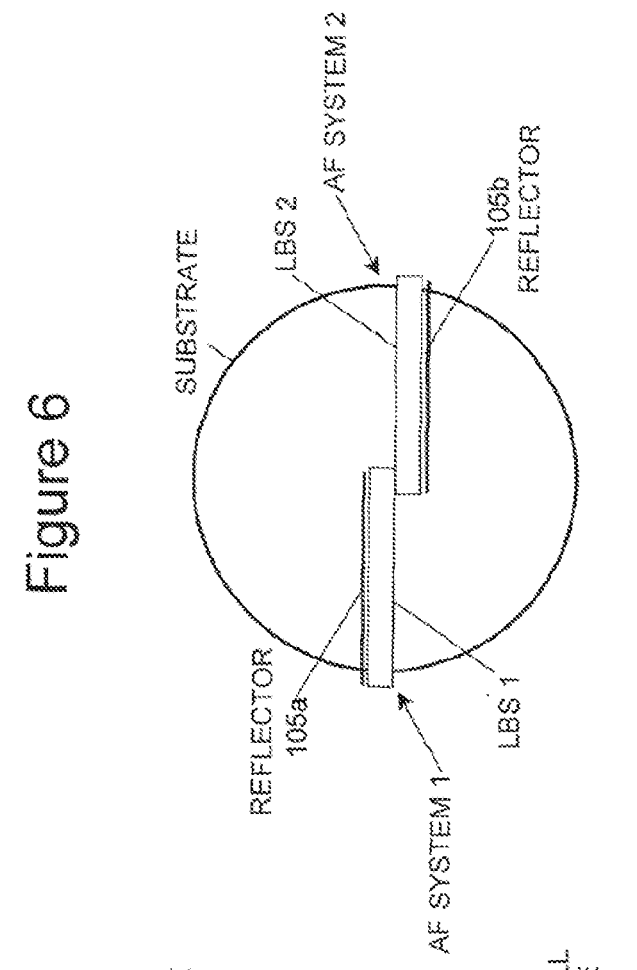
FIG. 6 is a schematic illustration of a way of designing certain system components, where it is impracticable to provide a single long beam splitting optic for a system and method according to the present invention.

To use the principles of the present invention on a 450 mm diameter substrate, a single AF system that can measure the substrate in a single pass requires a long beam splitting optic (LBS) that is at least 450 mm long, depending on the other dimensions of the beam splitting optic. This may be difficult to fabricate. An alternate approach is to use two AF systems side by side to span the entire 450 mm substrate, each of which is about 250 mm in length, side by side to span a 450 mm substrate. FIG. 6 schematically illustrates this concept, in which two AF systems, each with a respective long beam splitting optic and a respective reflector (e.g. 105a, 105b) are proposed. Each long beam splitting optic with a chromatic reflective coating selects some bandwidth of the source to be used as a reference signal for each AF channel, which is sent out the side of the long beam splitting optic to a reflector oriented as in FIGS. 2a-2c in one implementation, or to a reflector just above the substrate (as in FIG. 4) in another implementation. The reflector and nominal substrate position are aligned such that the reference beam recombines with the measurement beam (that was incident on the substrate) and is collinear. The common path nature of the reference beam means it will measure the same environmental refractive index changes, vibrating mirror errors, optical component changes, and drifts of the sending and receiving slits relative to each other (assuming it uses the same slits, as in FIG. 3). By subtracting the reference signal from the measurement signal, all of these errors are removed from the AF measurement signal. The result is a measurement of the difference in substrate height position relative to the reflector (reference mirror). Thus, the principles of the present invention compensate two potential sources in an AF system: humidity, pressure and temperature changes of the air, and drifts and instabilities of the vibrating mirror or other optical components.

It should also be noted that if heat from the substrate stage introduces a temperature gradient that is undesirable for the beam splitting optics, one or more heating elements may be provided for the reflector, to create equivalent temperature gradients for the measurement and reference paths.

In addition, it should be noted that the system and method of the present invention can be adapted to prevent ghost reflections from causing errors in the autofocus signal. Specifically, since the autofocus beams are incident at a grazing angle of incidence on the top surface of the long beam splitting optic, the amount of light reflected at the interface will be high in the absence of any anti-reflection coating. Each beam crosses the prism/air boundary four times (See FIGS. 2a-2c), so light loss can become a serious issue. This problem can be alleviated somewhat by increasing the power in the light source, perhaps by using several laser diodes at various wavelengths. A nano-structured coating may also reduce the amount of reflected light at the interface for a range of wavelengths and polarization states. However, any coating will result in some residual reflection, which in turn becomes an unwanted ghost reflection that can influence the slit detector signal, causing errors. The numerical aperture (NA) of the autofocus beams is relatively small, so if the long beam splitting optic prism is rotated about the x-axis (as indicated in FIGS. 2a-2c) such that light reflected from the top, bottom or side surface is at an angle larger than the maximum angle of the NA of the autofocus beam, the stray reflections will be blocked in the rest of the optical system. Since the beam splitting optic prism is optically a plane parallel plate, the beam emerges from the bottom in the xz plane, so the sensitivity is unchanged. The reference beam, however, will emerge from the side of the beam splitting optic approximately twice the rotation angle relative to the xy plane; therefore, the reflector must be rotated such that the reference beams are still normally incident in the yz plane so that they remain collinear with the measurement beams after exiting the prism. Rotating the long beam splitting optic prism as described will prevent the ghost reflections from causing errors in the autofocus signal.

In the basic aspects of this invention, as described above, the reference and measurement beams should be much less sensitive to index changes caused by environmental fluctuations, since the beams are common path through the majority of the system, including most of the air paths. However, there is still about 30 mm of non-common air path between the bottom face of the reference beam splitting optic and the substrate (measurement beam), or between the side face of the beam splitting optic and the reflector 105 (which creates the reference beam component). An index difference between the two non-common air regions can cause a substrate height measurement error. In addition, the beam parity will be opposite in these spaces for the two beams due to the extra reflection for the reference beam, as shown in FIGS. 2a-2c. So, as illustrated schematically in FIGS. 7a, 7b, to compensate for index differences in the non common air spaces between the beam splitting optic and the reflector, in either of the implementations of FIGS. 2a-2c or FIG. 4, the present invention provides for directing a controlled air flow from a dedicated air supply to the non common first and second air spaces between the beam splitting optic the substrate and the reflector.

Figure 7A:
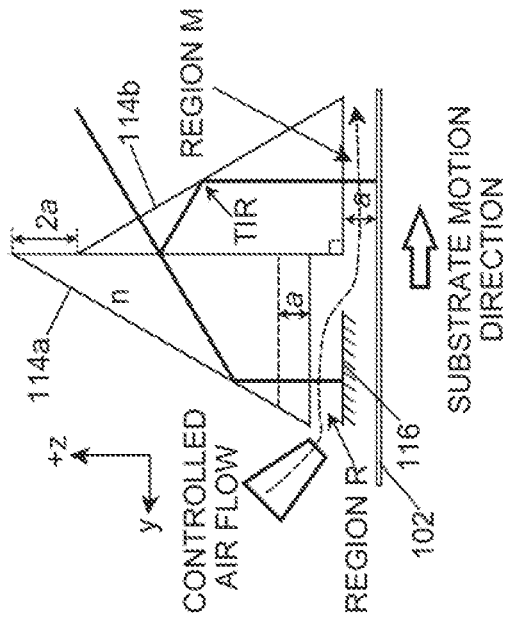
FIGS. 7a and 7b are schematic illustrations of a way of adjusting for the effect of index differences, in a system and method according to the principles of the present invention.

Also, if there is an index gradient in the air common to region R and region M, its effects will not cancel when the reference signal is subtracted; in fact, it will be doubled. Finally, changes in the index gradient during the period of the vibrating mirror vibration can cause a third type of error. As explained further below, to adjust for index gradients in the non common first and second air spaces, the reference and measurement beams that emerge from the beam splitting optic are directed through one or more slits and detected by means of slit detectors, and the geometry of the sending and detecting slits can be changed to reduce or remove the sensitivity to index gradients in the non common first and second air spaces. Moreover, to adjust for changes in index gradients with time in the first and second non common air spaces, the present invention provides adjusting the sizes of the detection slits. More specifically, FIG. 7 (a, b) shows the two prism configurations disclosed in FIGS. 2a-2c and FIG. 4. Both have the parity issue in the non-common air spaces, but because of the coordinate system of Geometry B, it will be used to explain which gradients can cause a problem. An identical index gradient in the y direction in regions R and M will cause opposite apparent errors of the substrate height, which will not cancel out when the reference is subtracted. Identical gradients in the x direction (in and out of the page) will cause the same apparent substrate height change, and so will cancel out when the reference signal is subtracted. In geometry B (FIG. 7b), if well controlled air flow can be achieved through region R, then region M and out the side of the system, index gradients in the y direction can be kept to a minimum. Likewise for geometry A (FIG. 7b), the air flow down through region R and out the side of region M should reduce the errors from this problem. It would probably be best if the substrate moved to the right, as shown in FIG. 7a, in the same direction as the air flow. The controlled air flow will reduce errors due to air index changes between regions R and M, as well.

Another approach to reducing the error due to these air index gradients is to change the slit geometry. A typical AF system has the slits oriented at 45 degrees relative to the x and y axes of the coordinate system shown in FIG. 5a in order to cover the entire substrate surface as it scans in the y direction. In this orientation, thermal gradients in the y direction cause errors of the substrate height measurement because it shifts the peak of the AF signal and it is doubled by the reference signal. However, if the slits are rotated such that their long dimension is in the y-direction (and the vibrating slit moves in the +/−x direction), as shown in FIG. 5b, then a static index gradient in the y-direction will shift the slit image in the y-direction, but it will not cause a substrate height error. This is because it will look like the substrate reflectance was simply reduced; the AF signal strength goes down by a constant factor. The drawback is that the slit images no longer examine the entire substrate surface as it scans in y, but this problem is addressed below. The only way a gradient in y causes errors is if it changes during a period of vibration of the vibrating mirror (nominally several kilohertz, or T<1 ms). This is unlikely to be a problem. For the same reason, thermal gradients in the y direction inside the long beam splitting optic will not cause errors unless they are changing faster than 1 ms. This is very unlikely to be the case inside the glass.

Figure 8A:
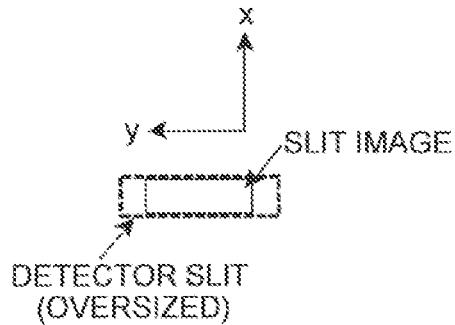
FIGS. 8a and 8b are schematic illustrations of a way of adjusting for the effects of changes in index gradients with time, in a system and method according to the principles of the present invention.
Figure 8B:
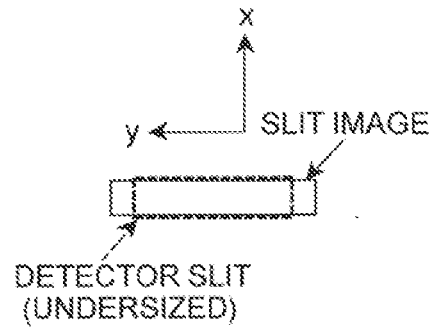

However, if the thermal gradients are evolving on this rapid time scale (index gradients changing with time on the order of a period of the vibrating mirror), another fix is to either oversize the slit detector in y such that shifts in y of the slit image have no effect on the detected signal (FIG. 8a), or undersize the slit detector in y so that y shifts of the slit image don't change the signal either (FIG. 8b). In the second case, light is unnecessarily lost.

Figure 9:
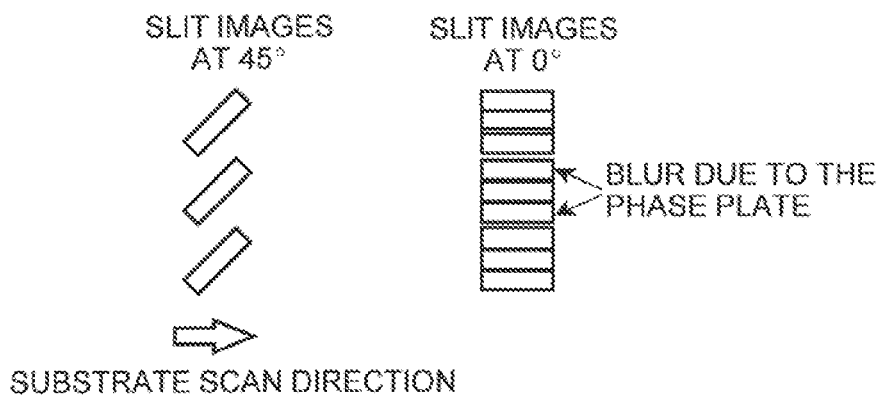
FIG. 9 is a schematic illustration of ways of spreading light on the substrate, in a system and method according to the principles of the present invention.

One of the advantages of the 45° slit orientation on the substrate is that more of the substrate surface is used during the AF mapping process. However, the same effect can be achieved by engineering a phase plate such that light is incident on the substrate over a larger area, as shown in FIG. 9. Additional background on such a phase plate, and other background information that is believed useful to those in the art in connection with the present invention, can be found in an article entitled *Error analysis and compensation method of focus detection in exposure apparatus*, authors Hidaka et al, published in the January 2009 edition of the Journal of the Optical Society of America, Vol 26, No. 1, which article is incorporated by reference herein.

Figure 7B:
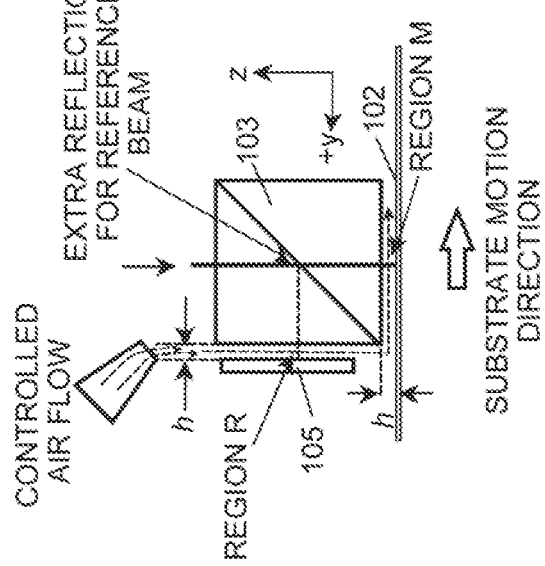

An alternative approach to removing errors due to index gradients in the y-direction is to use a second AF system where the signals are sent in from the right side in geometry A (FIG. 7a) or from the top left side in geometry B (FIG. 7b). In either case, the reference signal of the second AF system will have opposite parity of the reference signal of the first AF system. Also, the measurement signal of the second AF will have opposite parity of the measurement signal of the first AF system. Therefore, assuming the AF beams are collinear in the non-common air path regions R and M, the two systems will see equal but opposite errors from the gradients in the y-direction (assuming the slits are still oriented at 45°). Changes in the substrate height will give the same sign change in both signals, so an average of the signals from the two systems will cancel out the errors from the index gradients in the y direction. Unfortunately, this is probably not the ideal configuration since it requires two AF systems and because of the influence of multilayer errors from the substrate surface. The nominal reference signal for both geometries (A or B) employs a subset of wavelengths used as the reference signal, which in the case of a second AF system, would become the wavelengths used as the measurement signal for the second AF system. Therefore, the multilayer effects due to the substrate would be different for the two AF systems, and those errors would likely not cancel out when the two AF signals are averaged together. Plus, this approach is more complicated than simply changing the slit orientation.

Accordingly, the present invention provides a new and useful system and method for compensating instabilities in an autofocus system due to environmental factors and/or system components. The system and method of the present invention is also designed to compensate for possible errors due to index differences, index gradients and changes in index gradients with time in the non-common air paths. Index differences are controlled by using a dedicated air supply to the non-common air path regions to reduce index offsets between the two. Index gradients are fixed by changing the slit orientation (from 45 degrees to 0 degrees from the y-axis) or by using a second AF system. Changes in index gradients on a time scale faster than the period of the vibrating mirror can be addressed by changing the slit detection geometry. With the foregoing disclosure in mind, it is believed that various ways of compensating instabilities in an autofocus system due to environmental factors and/or system components, will be apparent to those in the art.

The invention claimed is:

1. A method for compensating instability in an optical autofocus system, which optical autofocus system uses light directed at and reflected from a substrate to determine changes in a height position of the substrate, the method comprising:
   a. deflecting a reference beam component of said light by a beam-deflecting optic located a predetermined distance from the substrate to form a deflected reference beam, said predetermined distance defining a first space;
   b. providing a reflector, spaced from the beam-deflecting optic by said predetermined distance, to define a second space between the reflector and the beam-deflecting optic;
   c. directing a measurement beam component of said light at the substrate to form a reflected measurement beam that is directed from the substrate through the first space between the substrate and the beam-deflecting optic, while directing the deflected reference beam at the reflector to form a reflected reference beam that is directed from the reflector through the second space;
   d. returning the reflected reference beam and the reflected measurement beam such that the reference beam and the reflected measurement beam emerge substantially collinearly from the beam-deflecting optic;
   e. detecting the reflected reference beam and the reflected measurement beam and producing from said beams information enabling compensation for changes in the height position of the substrate, said changes defined by instabilities in at least one of the optical autofocus system and environmental factors; and
   f. propagating the deflected reference beam formed by the beam-deflecting optic and the reflected reference beam formed by the reflector along a first plane, which first plane crosses a second plane, said second plane defined by the measurement beam component incident onto the substrate and the reflected measurement beam formed at the substrate.

2. The method of claim 1, wherein the providing a reflector includes providing a reflector, position and orientation of which relative to the beam-deflecting optic are maintained substantially fixed.

3. The method of claim 1, wherein the optical autofocus system is of the slit detection type,
   wherein light reflected from the substrate is passed through a slit before impinging on a slit detector, and
   wherein said detecting the reflected reference beam and the reflected measurement beam comprises directing the reflected reference beam and the reflected measurement beam through a beam splitter disposed between the slit and detectors that respectively correspond to the reflected reference beam and the reflected measurement beam.

4. The method of claim 1, wherein the substrate is moveable in a first direction and said providing a reflector includes providing the reflector that has a reflective surface in a plane oriented substantially transversely to the first direction.

5. The method of claim 1, wherein the substrate is moveable in a first direction and said providing a reflector includes providing the reflector that has a reflective surface in a plane oriented substantially parallel to the first direction.

6. The method of claim 5, wherein said deflecting a reference beam includes deflecting a reference bean with the beam-deflecting optic that comprises a pair of adjacent 30-60-90 degree prisms with respective sides that are adjacent to and offset from each other in a direction transverse to the first direction.

7. The method of claim 1, wherein the first and second spaces between the substrate and the beam-deflecting optic and between the reflector and the beam-deflecting optic are non-common, and further comprising adjusting for index differences in said non-common first and second spaces.

8. The method of claim 7, wherein said adjusting for index differences comprises directing a dedicated air supply to the non-common first and second spaces.

9. The method of claim 1, wherein the first and second spaces are non-common, and further comprising adjusting for index gradients in said non-common first and second spaces.

10. The method of claim 9,
    wherein the optical autofocus system is of a slit detection type,
    wherein light reflected from the substrate is passed through a slit before impinging on a slit detector,
    wherein the reference and measurement beams are detected by means of respective detection slits, and
    wherein said adjusting for index gradients in said non-common first and second spaces includes changing orientations of respective detection slits of said system.

11. The method of claim 10, further including adjusting for changes in index gradients with time in said non-common first and second spaces.

12. The method of claim 11, wherein said adjusting for changes in index gradients with time comprises adjusting sizes of the respective detection slits for the reflected measurement beam and the reflected reference beam.

13. The method of claim 1, further including adjusting for changes in index gradients with time in the first and second spaces, said first and second spaces being non-common.

14. The method of claim 13,
    wherein the optical autofocus system is of a slit detection type,
    wherein light reflected from the substrate is passed through a slit before impinging on a slit detector, and wherein said adjusting for changes in index gradients with time includes adjusting sizes of respective detection slits of said system for the reflected measurement and reference beams.

15. An optical autofocus system that uses light directed at and reflected from a substrate to determine changes in a height position of the substrate, said system comprising:

a beam-deflecting optic located at a predetermined distance from the substrate, said predetermined distance creating a first space between the beam-deflecting optic and the substrate;

a reflector spaced from the beam-deflecting optic by the predetermined distance and creating a second space between the beam-deflecting optic and the reflector, wherein the beam-deflecting optic is configured to deflect a reference beam component of said light to the reflector to form a deflected reference beam, propagating towards the reflector such that a) the deflected reference beam and a reflected reference beam, formed in reflection of said deflected reference beam from the reflector, propagate along a first plane, and wherein b) a measurement beam component of said light incident at the substrate and a reflected measurement beam, formed in reflection of said measurement beam component from the substrate propagate along a second plane, said second plane intersecting the first plane;

detectors that respectively detect light from the reflected reference beam and the reflected measurement beam; and a processing device configured to generate, from so detected light, data based on which said system is configured to compensate for changes in the height position of the substrate, said changes defined by instabilities in at least one of system components and environmental factors.

16. The optical autofocus system of claim 15, wherein position and orientation of the reflector relative to the beam-deflecting optic are maintained substantially fixed.

17. The optical autofocus system of claim 15, wherein the optical autofocus system is of a slit detection type configured such that light reflected from the substrate is passed through a slit before impinging on said detectors, and further comprising a beam splitter positioned between the split and said detectors.

18. The optical autofocus system of claim 15, wherein the substrate is moveable in a first direction and the reflector has a reflective surface in a plane oriented substantially transversely to the first direction.

19. The optical autofocus system of claim 15, wherein the substrate is moveable in a first direction and the reflector has a reflective surface in a plane oriented substantially parallel to the first direction.

20. The optical autofocus system of claim 19, wherein the beam-deflecting optic comprises a pair of adjacent 30-60-90 degree prisms with respective sides that are adjacent to and offset from each other in a direction transverse to the first direction.

21. The optical autofocus system of claim 15, wherein the first and second spaces are non-common, and further including one or more fluid conduits provided for directing a dedicated air supply to said non-common first and second spaces to minimize index differences in said non-common first and second spaces.

22. The optical autofocus system of claim 21, wherein the optical autofocus system is of a slit detection type configured to pass light reflected from the substrate through a slit before impinging said light on a detector from said detectors, wherein detection slits are oriented such as to reduce sensitivity to index gradients in the non-common first and second air spaces.

23. The optical autofocus system of claim 22, wherein sizes of the detection slits are adjustable to compensate for changes in the index gradients with time in the non-common first and second spaces.

24. The optical autofocus system of claim 15, wherein the optical autofocus system is of a slit detection type, wherein the first and second air spaces are non-common, said system configured to pass light reflected from the substrate through a slit before impinging said light on a detector from said detectors, and further comprising detection slits respectively corresponding to the measurement and reference beams, sizes of said detection slits being adjustable to compensate for changes in index gradients with time in the non-common first and second spaces.

* * * * *